(12) United States Patent
Yamagishi et al.

(10) Patent No.: US 10,192,538 B2
(45) Date of Patent: Jan. 29, 2019

(54) MOBILE BODY

(71) Applicant: Sony Interactive Entertainment Inc., Tokyo (JP)

(72) Inventors: Takeshi Yamagishi, Tokyo (JP); Osamu Ota, Tokyo (JP)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 0 days.

(21) Appl. No.: 15/655,955

(22) Filed: Jul. 21, 2017

(65) Prior Publication Data
US 2018/0033421 A1 Feb. 1, 2018

(30) Foreign Application Priority Data

Jul. 29, 2016 (JP) .................................. 2016-149801

(51) Int. Cl.
| | | |
|---|---|---|
| *G10K 11/178* | (2006.01) | |
| *B64C 39/02* | (2006.01) | |
| *B64D 47/00* | (2006.01) | |
| *B64D 47/08* | (2006.01) | |
| *H04N 7/18* | (2006.01) | |
| *H04R 1/02* | (2006.01) | |

(52) U.S. Cl.
CPC .......... *G10K 11/178* (2013.01); *B64C 39/024* (2013.01); *B64D 47/00* (2013.01); *B64D 47/08* (2013.01); *G10K 11/1785* (2018.01); *G10K 11/17873* (2018.01); *H04N 7/185* (2013.01); *H04R 1/028* (2013.01); *B64C 2201/027* (2013.01); *B64C 2201/108* (2013.01); *G10K 2210/1281* (2013.01); *G10K 2210/3011* (2013.01); *G10K 2210/3044* (2013.01); *G10K 2210/3219* (2013.01); *H04R 2499/13* (2013.01)

(58) Field of Classification Search
CPC ............. G10K 11/178; G10K 11/1782; G10K 2210/1281; G10K 2210/3011; G10K 2210/3044; B64C 39/024; B64C 47/00; B64C 47/08; B64C 2201/027; B64C 2201/108; H04N 7/185; H04R 1/028; H04R 2499/13; B64D 47/00; B64D 47/08
USPC ........................... 381/71.1, 71.13, 71.3, 71.4
See application file for complete search history.

(56) References Cited

U.S. PATENT DOCUMENTS

| | | | |
|---|---|---|---|
| 9,646,597 B1* | 5/2017 | Beckman | B64C 39/024 |
| 10,013,900 B2* | 7/2018 | Beckman | G09F 9/33 |
| 2016/0063987 A1* | 3/2016 | Xu | B64C 39/024 381/71.12 |
| 2017/0178618 A1* | 6/2017 | Beckman | G10K 11/1788 |
| 2017/0193704 A1* | 7/2017 | Leppanen | G06T 19/006 |
| 2017/0287463 A1* | 10/2017 | Christoph | G10K 11/1788 |

* cited by examiner

*Primary Examiner* — William A Jerez Lora
(74) *Attorney, Agent, or Firm* — Katten Muchin Rosenman LLP

(57) ABSTRACT

A mobile body includes a driving mechanism, a speaker, and a control unit. The driving mechanism supplies power moving the mobile body. The control unit generates from the speaker a sound wave canceling a driving sound generated from the driving mechanism.

5 Claims, 3 Drawing Sheets

MOBILE BODY

BACKGROUND

The present disclosure relates to a mobile body that moves by operation of a driving mechanism.

There are known mobile bodies provided with a mechanism for autonomous movement, such as robots that move on the ground or drones (unmanned aerial vehicles) that fly.

SUMMARY

Such a mobile body is provided with a driving mechanism, such as a motor or actuator, for supplying power for movement. A driving sound generated due to the operation of the driving mechanism may be a noise which is unpleasant to human beings.

The present disclosure has been made in view of the above circumstances. There is a need for a mobile body that can suppress a noise emitted from the mobile body to the surroundings.

According to an embodiment of the present disclosure, there is provided a mobile body including a driving mechanism that supplies power moving the mobile body, a speaker, and a control unit that generates from the speaker a sound wave canceling a driving sound generated from the driving mechanism.

DETAILED DESCRIPTION OF THE PREFERRED EMBODIMENT

Figure 1:
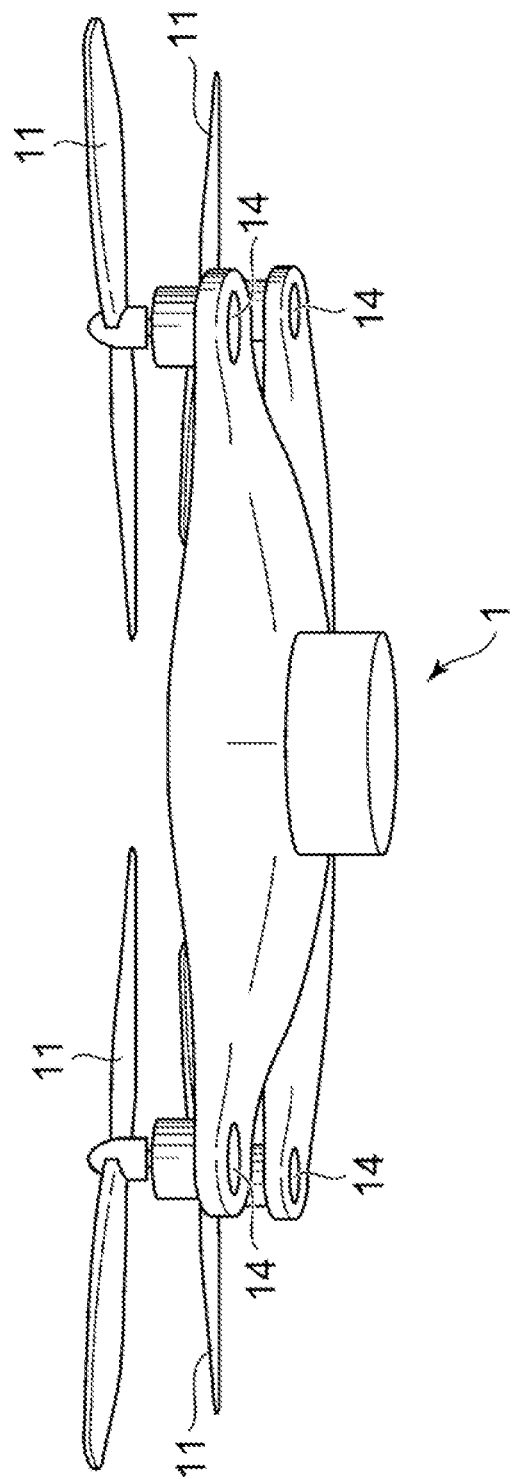
FIG. 1 shows an external appearance of a mobile body according to an embodiment of the present disclosure.

An embodiment of the present disclosure will be described in detail below, referring to the drawings.

Figure 2:
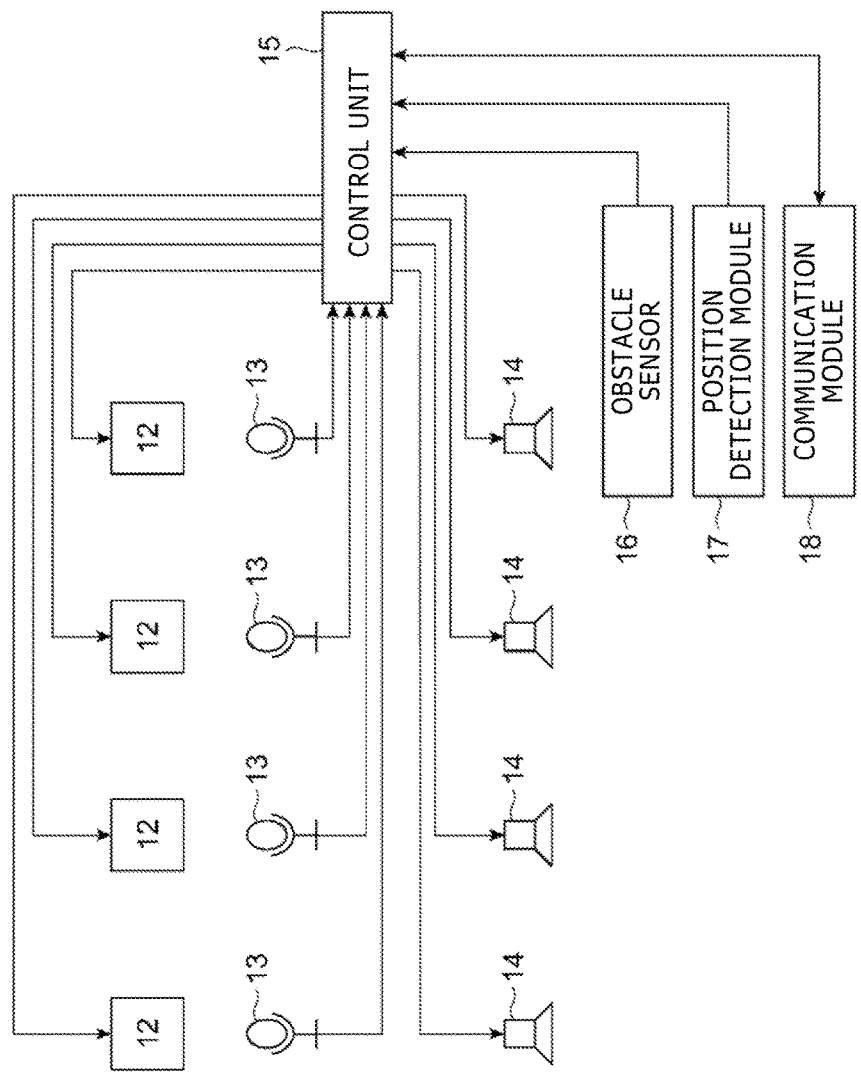
FIG. 2 is a configurational block diagram showing an internal configuration of the mobile body according to the embodiment of the present disclosure.

FIG. 1 shows an external appearance of a mobile body 1 according to an embodiment of the present disclosure. The mobile body 1 according to the present embodiment is a drone that is provided with propellers and flies. In addition, FIG. 2 is a configurational block diagram showing an internal configuration of the mobile body 1. As illustrated in these figures, the mobile body 1 includes a plurality of propellers 11, a plurality of driving mechanisms 12, a plurality of microphones 13, a plurality of speakers 14, a control unit 15, an obstacle sensor 16, a position detection module 17, and a communication module 18.

The mobile body 1 includes four propellers 11 and four driving mechanisms 12, wherein the propellers 11 and the driving mechanisms 12 are in one-to-one correspondence. The propellers 11 are driven by power supplied from the driving mechanisms 12, and the mobile body 1 flies by rotation of the propellers 11.

Figure 3:
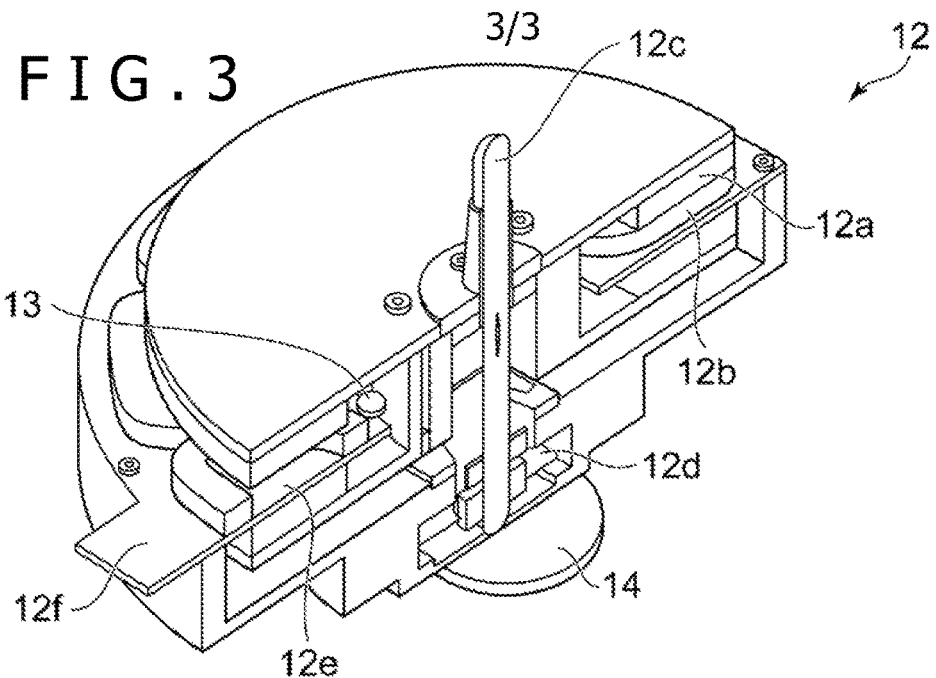
FIG. 3 is a sectional perspective view of a driving mechanism.

FIG. 3 is a sectional perspective view of the driving mechanism 12. In the example of FIG. 3, the driving mechanism 12 includes a rotor magnet 12a, a stator coil 12b, a shaft 12c, an encoder 12d for detection of rotational speed, a Hall element 12e for detection of rotor position, and a stator substrate 12f. The propeller 11 is fixed to the shaft 12c.

In the present embodiment, one microphone 13 and one speaker 14 are mounted to each of the four driving mechanisms 12. As depicted in FIG. 3, the microphone 13 is disposed inside a housing that accommodates the driving mechanism 12, and collects a driving sound generated by driving of the driving mechanism 12. The speaker 14 is composed of a voice coil fixed to a lower surface of the driving mechanism 12, and generates a sound toward the surroundings of the mobile body 1.

The control unit 15 includes a microcomputer, a digital signal processor (DSP), and the like, and controls operations of components of the mobile body 1. Specifically, the control unit 15 outputs a control signal to each of the driving mechanisms 12, to operate the driving mechanisms 12. In addition, particularly in the present embodiment, the control unit 15 outputs to the speakers 14 voice signals produced based on voices collected by the microphones 13, to thereby generate from the speakers 14 sound waves according to the voice signals. Here, the sound waves generated by the speakers 14 are sound waves in antiphase such as to cancel the voices collected by the microphones 13. In other words, the control unit 15 carries out active noise canceling. As a result, the driving sounds of the driving mechanisms 12 that are collected by the microphones 13 are canceled, and the driving sounds are hardly heard in the outside of the mobile body 1. Hereinafter, the sound waves emitted from the speakers 14 for canceling other sound waves will be referred to as canceling sound waves.

For realizing effective noise canceling, it is desirable for the microphones 13 to be disposed at positions as close as possible to generation sources of the voices to be canceled. For this reason, in the present embodiment, the microphone 13 is disposed inside the housing that accommodates the driving mechanism 12, such that the microphone 13 is not exposed to an outer surface of the mobile body 1. Note that in the inside space of the driving mechanism 12, the microphone 13 is disposed particularly near a member that generates a large driving sound. In addition, in the case where the microphone 13 may not be incorporated in the housing for the driving mechanism 12, also, the microphone 13 should be disposed at a position as close as possible to the driving sound generation source of the driving mechanism 12.

It is desirable for the speaker 14, also, to be disposed at a position comparatively close to a generation source of the voice to be canceled. While the speaker 14 is disposed at a surface of the housing for the driving mechanism 12 in the present embodiment, this is not restrictive, and the speaker 14 may be incorporated in the inside of the driving mechanism 12. In this case, for a sound from the speaker 14 to be emitted to the exterior, the housing for the driving mechanism 12 may be provided with an opening at a position faced by the speaker 14. In addition, while one speaker 14 is disposed for one driving mechanism 12 here, this configuration is not restrictive, and a plurality of speakers 14 may be provided for one driving mechanism 12. In the latter case, the speakers 14 are disposed in different orientations, whereby canceling sound waves can be emitted to a wider range. Besides, in this case, it is desirable that the plurality of speakers 14 be disposed in such a manner as to surround the voice generation source.

Furthermore, in the present embodiment, the control unit 15 does not continuously carry out the noise canceling control, but starts or interrupts the noise canceling control at timings determined according to the operation circumstances of the mobile body 1. Specific examples of the noise canceling control according to the operation circumstances of the mobile body 1 will be described later.

The obstacle sensor 16 detects the presence of an object in the surroundings of the mobile body 1. Specifically, the obstacle sensor 16 may be a camera, an ultrasonic sensor, or the like. In addition, the obstacle sensor 16 may be a far infrared sensor that detects an object with a comparatively high temperature, such as a human.

The position detection module 17 is a module for detecting the current position of the mobile body 1, and may be, for example, a global positioning system (GPS) module. By utilizing the results of detection by the position detection module 17, the mobile body 1 can find the current position of itself.

The communication module 18 performs radio communication between itself and an external communication apparatus. Particularly, in the present embodiment, the mobile body 1 performs communication between itself and a GPS device possessed by a user through the communication module 18. By utilizing the position information on the user that is acquired from the GPS device and the results of detection by the position detection module 17, the mobile body 1 can performs a control such as detection of the approach thereof to the user or movement thereof to a place where the user is present.

Now, a specific example of the noise canceling control carried out by the control unit 15 will be described below. The control unit 15 may perform the noise canceling control, in principle continuously, during when the driving mechanisms 12 are operated. In addition, the noise canceling control may be started in the case where a sound in a predetermined frequency range, such as a sound unpleasant to humans, is detected or in the case where a sound of a volume of not less than a predetermined level is detected.

Furthermore, during when the noise canceling control is performed under the above-mentioned conditions, the operation circumstances of the mobile body 1 may be monitored and the noise canceling control may be stopped when a predetermined condition is satisfied. Now, various conditions for determining that the noise canceling is to be started or stopped will be described below.

First, as first and second examples, examples wherein the presence of a human in the surroundings of the mobile body 1 is detected and the noise canceling control is stopped according to the detection results will be described.

As a first example, the control unit 15 may stop the noise canceling when it is detected by the obstacle sensor 16 that an object is present in a predetermined range in the surroundings of the mobile body 1. This is because in the case where a human is present close to the mobile body 1, it may be dangerous if the mobile body 1 does not generate any sound.

As a second example, the control unit 15 may stop the noise canceling when it is determined, based on position information on a GPS device received by the communication module 18, that a user carrying the GPS device is present in a predetermined distance range from the mobile body 1. This is for the same reason as the first example.

As a third example, the control unit 15 may stop or start the noise canceling in accordance with position information on the mobile body 1. Specifically, the control unit 15 may stop the nose canceling having been performed, when it is determined, based on the results of detection by the position detection module 17, that the mobile body 1 has entered a predetermined area, for example. Such a control makes it possible to stop the noise canceling control when the mobile body 1 has entered a place where the presence of the mobile body 1 in the surrounds should preferably be recognized, such as in a residence. In addition, in the case where the mobile body 1 has entered an area where the mobile body 1 should intrinsically not enter, the presence of the mobile body 1 in the area can be noticed to the surroundings. Besides, the control unit 15 may determine the elevation of the mobile body 1 above the earth's surface on the basis of, for example, the results of detection by the position detection module 17 and may start and stop the noise canceling in accordance with the determined elevation. Specifically, in a place at a high elevation, it is supposed that no human is present in the place; in view of this, the control unit 15 stops the noise canceling when the elevation of the mobile body 1 is not less than a predetermined value, and starts the noise canceling when the elevation of the mobile body 1 is reduced to below a predetermined value. By such a control, power consumption due to undesirable noise canceling control can be prevented.

Not being limited to the above-mentioned examples, the control unit 15 may start or stop the noise canceling in accordance with the results of detection by various sensors mounted on the mobile body 1.

As a fourth example, an example wherein the noise canceling is interrupted at the time of imaging by a camera will be described. In this example, the mobile body 1 is provided with a camera for imaging the surroundings of the mobile body 1. The camera may be a still camera for taking a still image, or may be a video camera for shooting a video image. The control unit 15 interrupts the noise canceling prior to the start of imaging by the camera, and resumes the noise canceling after the imaging is finished. This is for not performing imaging in a state in which the person in the surroundings is unaware of the mobile body 1.

As a fifth example, an example wherein the noise canceling is conducted at the time of reproducing a voice from the speakers 14 will be described. In this example, the speakers 14 reproduce not only a canceling sound wave but also various kinds of voices. The control unit 15 performs noise canceling while a specific voice is reproduced from the speakers 14. Examples of the specific voice in this case include a shutter sound at the time of shooting with a camera, and a guiding voice for transmitting some information to the user. By performing noise canceling at the time of reproducing such a specific voice, the specific voice can be made to be easily audible to the user, through the canceling of the driving sounds of the driving mechanisms 12. Note that while the canceling sound wave and the other voice to be heard by a human are simultaneously reproduced from the speakers 14 here, the specific voice may be reproduced from other speaker than the speakers 14 for noise canceling.

In addition, the above-described examples are not restrictive, and the control unit 15 may carry out noise canceling or interrupt noise canceling during when a predetermined module mounted on the mobile body 1 is operated or during when a predetermined function is carried out.

Besides, the above-described examples are not limitative, and the control unit 15 may start/stop noise canceling on various conditions. For instance, the control unit 15 may receive a control signal from the outside and may start/stop noise canceling in accordance with the received control signal.

In addition, while the mobile body 1 has canceled the driving sounds generated due to the operation of the driving mechanisms 12 in the above description, the mobile body 1 may perform a control for canceling other sound. For example, the microphones 13 may be disposed at positions where sounds in the surroundings of the mobile body 1 can be collected, and, when some noise is generated in the surroundings of the mobile body 1, the control unit 15 may cause a canceling sound wave for canceling the noise to be emitted from the speakers 14. Further, in the case where the microphones 13 have directivity, the control unit 15 may, upon detection of generation of a sound by the microphones 13, move the mobile body 1 in the direction of the generation source of the sound. By this, the mobile body 1 itself can approach the generation source of the sound and can cancel the sound.

Besides, while the canceling sound wave has been produced based on the voice signal collected by the microphones 13 in the above description, the control unit 15 may generate the canceling sound wave independently of the microphones 13. Specifically, for example, driving sounds of the driving mechanisms 12 are preliminarily sampled, and information on the frequency or voice waveform of canceling sound waves for canceling the driving sounds is preliminarily stored in a memory. During driving of the driving mechanisms 12, the control unit 15 generates from the speakers 14 the canceling sound waves based on the information.

Further, in this case, the control unit 15 may vary the canceling sound wave to be generated, according to the contents of driving of the driving mechanisms 12. The driving sound generated from the driving mechanism 12 differs depending on the difference in the contents of driving, such as rotational speed of the motor, of the driving mechanism 12. In view of this, the control unit 15 outputs to the driving mechanisms 12 control signals designating the contents of driving, and generates from the speakers 14 canceling sound waves determined according to the contents of driving thus designated. More specifically, for example, in the case where the control unit 15 varies the rotational speed of the driving mechanism 12 at some stages, frequencies of the canceling sound waves corresponding to the respective stages are preliminarily stored. When the control unit 15 outputs to the driving mechanism 12 a designation of a change in the rotational speed, the control unit 15 generates from the speaker 14 a canceling sound wave at the frequency corresponding to the changed rotational speed. By this, the canceling sound waves for canceling the driving sounds that vary dynamically can be generated, without need to collect the driving sounds by the microphones 13.

The speakers 14 mounted on the mobile body 1 can be utilized also for other purposes than the generation of the canceling sound waves. For instance, in the case where the speakers 14 can generate ultrasonic waves at a frequency in excess of the human audible range, ultrasonic waves may be generated from the speakers 14 and reflected sounds of the ultrasonic waves may be detected by the microphones 13, whereby the microphones 13 and the speakers 14 can be used for detection of obstacles, in place of the obstacle sensor 16. Note that since the canceling sound waves and the ultrasonic waves for obstacle detection are different from each other in frequency band, the mobile body 1 can perform detection of obstacles by use of the speakers 14 while performing a noise canceling control.

In addition, it is also possible to determine the position of the mobile body 1, by observing the ultrasonic waves generated by the speakers 14. The mobile body 1 has the plurality of speakers 14 mounted thereon, and the distance between the speakers 14 are preliminarily known. For this reason, when the ultrasonic waves emitted from the plurality of speakers 14 are received at an observation point on the ground and the phase difference upon reception is determined, the position of the mobile body 1 as viewed from the observation point can be determined. By such a technique, the user can grasp the position of the mobile body 1, even in the case where the mobile body 1 is carrying out the noise canceling control and the driving sounds of the mobile body 1 are not audible.

Note that embodiments of the present disclosure are not limited to the above-described. For instance, in the above description, the mobile body 1 has the plurality of driving mechanisms 12, and the microphones 13 and the speakers 14 are disposed in correspondence with the respective driving mechanisms 12. However, the mobile body 1 may have only one speaker 14, and canceling sound waves corresponding to the plurality of driving mechanisms 12 may be generated from the one speaker 14.

In addition, while the mobile body 1 has been a flying body in the above description, this is not restrictive, and the mobile body 1 may be a robot or a vehicle or the like that moves on the earth's surface. In accordance with this, the driving mechanisms 12 may be those of various kinds that include various motors or actuators or the like.

Figure 4:
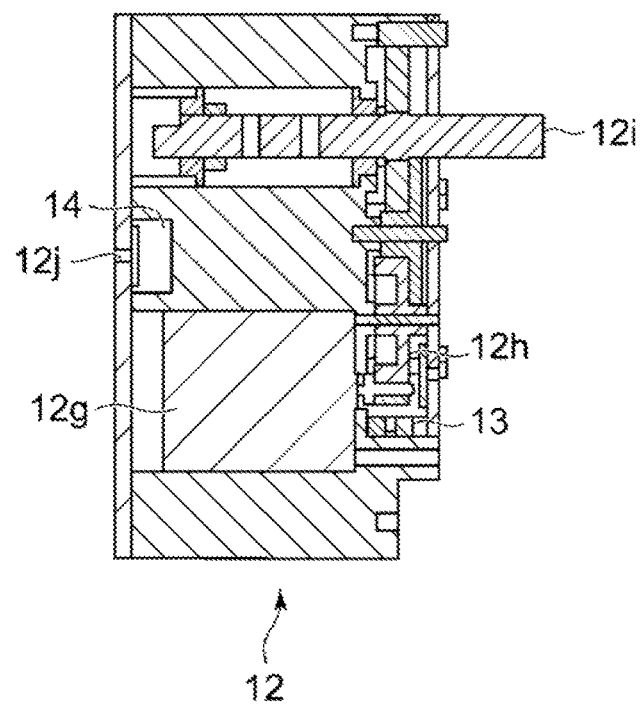
FIG. 4 is a sectional view showing another example of the driving mechanism.

FIG. 4 is a sectional view showing an example of a driving mechanism 12 of a different structure from that shown in FIG. 3. In the example of this figure, the driving mechanism 12 includes a motor 12g, a first-stage gear 12h, and a shaft 12i, wherein power generated by rotation of the motor 12g is transmitted to the shaft 12i through a plurality of gears inclusive of the first-stage gear 12h. In the example of this figure, not only a microphone 13 but also a speaker 14 is disposed inside a housing that accommodates the driving mechanism 12, and a surface of the housing for the driving mechanism 12 is provided with an opening 12j such that a sound generated from the speaker 14 is transmitted to the exterior.

Furthermore, in the example of this figure, it is presumed that a sound generated at a connection part between a rotary shaft of the motor 12g and the first-stage gear 12h is the greatest. For this reason, the microphone 13 is disposed in the vicinity of the rotary shaft of the motor 12g and the first-stage gear 12h.

The present disclosure contains subject matter related to that disclosed in Japanese Priority Patent Application JP 2016-149801 filed in the Japan Patent Office on Jul. 29, 2016, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mobile body comprising:
a driving mechanism that supplies power to rotors of the mobile body;
a speaker;
a global positioning system (GPS) module for detecting a geographic position of the mobile body;
a control unit that generates, from the speaker, a cancellation sound for canceling a driving sound generated by the driving mechanism,
wherein the control unit starts the cancellation sound when the geographic position is within a first geographic area, and
wherein the control unit stops the cancellation sound when the geographic position is within a second geographic area different than the first geographic area; and a camera for capturing a video;
wherein the control unit interrupts the cancellation sound when the camera is capturing the video, and
wherein the control unit enables the cancellation sound when the camera is not capturing the video.

2. The mobile body according to claim 1, further comprising:
a microphone that collects the driving sound,
wherein the control unit generates the cancellation sound based on the collected driving sound from the microphone.

3. The mobile body according to claim 2,
wherein the microphone is disposed inside a housing that accommodates the driving mechanism.

4. The mobile body according to claim 1,
wherein the mobile body includes a plurality of driving mechanisms and a plurality of speakers corresponding to the plurality of driving mechanisms, and
the control unit generates, from the plurality of speakers, a different cancellation sound for each of the driving mechanisms to be output by the corresponding speaker from the plurality of speakers.

5. A mobile body comprising:
a driving mechanism that supplies power to rotors of the mobile body;
a speaker;
a camera for capturing a video;
a detection module for detecting humans in the video; and
a control unit that generates, from the speaker, a cancellation sound for canceling a driving sound generated by the driving mechanism,
wherein the control unit starts the cancellation sound when the detection module does not detect humans in the video; and
wherein the control unit stops the cancellation sound when humans are detected in the video.

* * * * *